Figure 2:
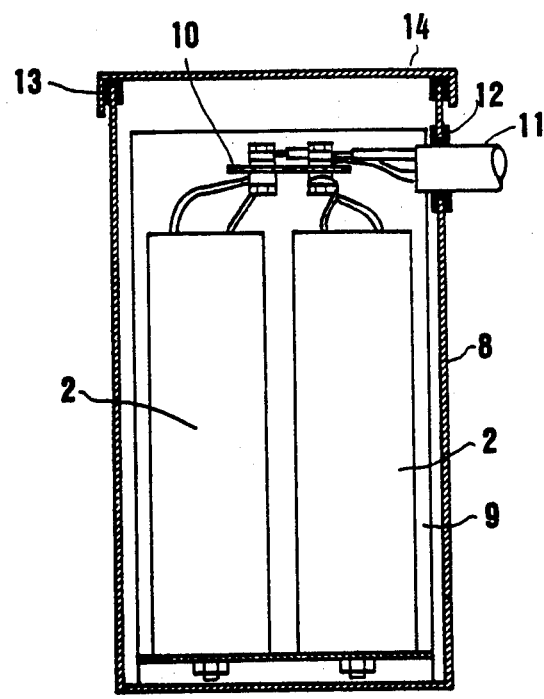

United States Patent [19]

Bozzini

[11] 4,109,291

[45] Aug. 22, 1978

[54] IMPREGNATED CONDENSER CONSTRUCTION FOR ELECTRIC POWER TRANSMISSION

[75] Inventor: Charles Bozzini, Charleroi, Belgium

[73] Assignee: ASEA Aktiebolag, Vasteras, Sweden

[21] Appl. No.: 778,622

[22] Filed: Mar. 17, 1977

[30] Foreign Application Priority Data

Mar. 17, 1976 [BE] Belgium .................................. 17264

[51] Int. Cl.² .............................................. H01G 1/02
[52] U.S. Cl. .................................... 361/272; 361/314; 361/329
[58] Field of Search ............... 361/272, 314, 274, 328, 361/329

[56] References Cited

U.S. PATENT DOCUMENTS 1,801,413   4/1931   Cowan .................................. 361/329

FOREIGN PATENT DOCUMENTS 764,753   6/1953   Fed. Rep. of Germany .......... 361/328

Primary Examiner—E. A. Goldberg
Attorney, Agent, or Firm—Bacon & Thomas

[57] ABSTRACT

A wet condenser construction constituted by a certain number of individual windings ganged in a tank, impregnated or treated with an insulating liquid and interconnected in series or in parallel. Each individual condenser winding is enclosed in an insulating closed casing reducing to a minimum the quantity of impregnated liquid. These individual condenser windings enclosed in their individual casings are disposed inside a closed tank in which the total volume of the voids between the insulating casings is appreciably greater than the total volume of the impregnated liquid contained in the insulating casings.

4 Claims, 2 Drawing Figures

U.S. Patent  Aug. 22, 1978  4,109,291

IMPREGNATED CONDENSER CONSTRUCTION FOR ELECTRIC POWER TRANSMISSION

The present invention relates to a wet condenser construction for use in power transmission.

Condensers are presently in existence, namely for small and medium size power, that is for less than 50 KVAR, which condensers are constituted by a certain number of individual condenser windings ganged in a tight tank, impregnated with an insulating liquid and interconnected in series and/or in parallel. The insulating liquid of these known condensers is generally a chlorinated insulator such as chlorinated diphenyl. However, there are many users that are now starting to move away from condensers comprising such impregnated liquids in spite of their excellent electric properties because of the danger of pollution that such condensers present in case of accident, at least where these condensers are intended for installations that are left without a continuous and alert watch.

The purpose of the present invention is to provide condensers that are treated with a dielectric liquid, that avoid the danger of pollution in case of accident to one of the individual windings and that are usable in installations that are not continuously under watch.

According to the invention, there is provided a condenser comprising a closed tank into which are fitted a predetermined number of insulated casings into each of which an individual condenser winding is closely fitted, the condenser windings being treated with an insulating liquid. Also according to the invention, the volume of the voids between the insulating casings in the tank is greater than the total volume of the insulating liquid of the windings.

Figure 1:
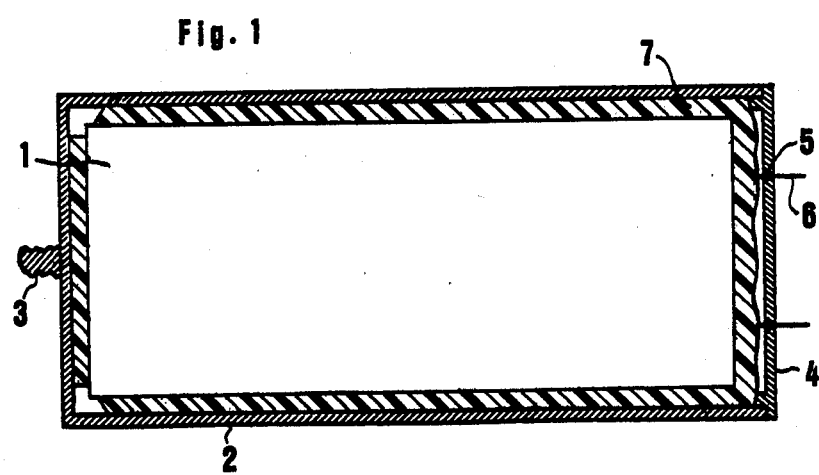

An embodiment of the invention will now be described with reference to the appended drawings wherein:

FIG. 1 is a cross-sectional view through an individual condenser winding and through the insulating casing into which it is contained, and FIG. 2 is a cross-sectional view through a tank containing insulating casings with individual condenser windings as shown in FIG. 1.

Referring to FIG. 1, there is shown an individual wound condenser constituted by a roll 1 in a casing 2 provided with a teat-screw 3 and closed by a cover 4 having two holes 5 for lead wires 6 of the condenser armatures. The roll 1 may be impregnated or otherwise treated by an appropriate dielectric liquid such as, for example, transformer oil, silicone oil, polybutene, polyisobutylene, castor oil etc. Because of the individual encasing of each roll, the quantity of dielectric liquid is always small. This is particularly so when, as shown in FIG. 1, the roll 1 is merely treated by soaking it for several hours in a dielectric liquid at about 100° C, drained off and placed inside the casing 2 and coated with a solidified resin 7 such as polyurethane, an epoxy resin or a polyester resin hardening at ambient temperature. This hardened coating resin 7 obviously can alternately serve as the casing 2.

According to FIG. 2, a tank 8 comprises a frame 9 provided with a terminal plate 10 on which are mounted individual condenser windings in insulating casings 2. This tank 8 is welded and therefore tight at the base and comprises, at its upper end, a through opening 11 for a lead wire and an access opening. An elastic toroidal through joint 12, provided at the location of the through opening, is compressed by the cable 11 that extends through it. An elastic joint 13 tops the edge of the access opening and is compressed by a cover 14 by means of tighteners, not shown, making the tank sufficiently tight for pressure differentials between the inside of the tank and the atmosphere. However, in the case of a large emission of gas inside the tank, following damage simultaneously to several individual condenser windings caused for instance by a network trouble, a leak through such elastic joints is permitted to avoid brutal explosion. The insertion of individual condenser windings in individual casings offers the additional advantage of avoiding that damage to one individual winding be transmitted to the others. The volume of the voids between the casings 2 and the inner wall of the tank 8 is by far greater than the total volume of the dielectric liquid contained in the casings 2. Even an emission of polluting gas following a damage to an individual roll may easily be absorbed in the volume of such voids without contaminating the ambient air.

I claim:

1. A condenser comprising:
a closed tank;
a predetermined number of insulating casings fitting into said tank there being voids between the insulating casings and between the casings and the inner wall of the tank;
individual condenser windings, each of said windings closely fitting into one of said casings, said windings being treated with an insulating liquid, and
wherein the total volume of the voids between said insulating casings in said tank is greater than the total volume of said insulating liquid of said windings whereby emission of gas from the condensers may be absorbed in the voids.

2. A condenser as claimed in claim 1, including means positively interconnecting said condenser windings comprising lead wires, and wherein said tank has a through opening having an elastic joint across which said lead wires extend.

3. A condenser as claimed in claim 2, wherein said tank has a removable cover and sealing means to ensure tight closing thereof.

4. A condenser as claimed in claim 1, wherein said insulating liquid is a dielectric liquid and wherein said condenser windings are impregnated with said dielectric liquid and coated with a synthetic resin solidifying at ambient temperature.

* * * * *